(12) United States Patent
Raschke

(10) Patent No.: US 7,977,636 B2
(45) Date of Patent: Jul. 12, 2011

(54) INFRARED IMAGING USING THERMAL RADIATION FROM A SCANNING PROBE TIP

(75) Inventor: Markus B. Raschke, Seattle, WA (US)

(73) Assignee: Anasys Instruments, Inc., Santa Barbara, CA (US)

( * ) Notice: Subject to any disclaimer, the term of this patent is extended or adjusted under 35 U.S.C. 154(b) by 336 days.

(21) Appl. No.: 12/228,539

(22) Filed: Aug. 12, 2008

(65) Prior Publication Data

US 2010/0045970 A1    Feb. 25, 2010

(51) Int. Cl.
G01J 5/02 (2006.01)
(52) U.S. Cl. ........... 250/338.1; 250/339.01; 250/339.07; 250/339.12; 850/33; 850/50; 850/52; 850/62
(58) Field of Classification Search ............... 250/338.1, 250/336.1, 339.03, 339.07, 339.08, 341.6, 250/341.1, 341.2; 219/50, 56.1, 56, 201, 219/221, 448.17, 461.1, 553; 850/50, 62, 850/52; 374/141, 159, 186, 117, 101, 9; 356/73

See application file for complete search history.

(56) References Cited

U.S. PATENT DOCUMENTS

| | | | | |
|---|---|---|---|---|
| 4,481,418 A * | 11/1984 | Vanzetti et al. | ............ | 250/338.1 |
| 5,724,139 A * | 3/1998 | Guerra | .......... | 356/600 |
| 6,002,471 A * | 12/1999 | Quake | ............. | 356/73 |
| 6,260,997 B1 * | 7/2001 | Claybourn et al. | ............. | 374/45 |
| 6,405,137 B1 * | 6/2002 | Reading | ............. | 702/22 |
| 2002/0005481 A1 * | 1/2002 | Williams | ....... | 250/306 |
| 2005/0259252 A1 * | 11/2005 | Hillenbrand et al. | ....... | 356/326 |
| 2009/0205089 A1 * | 8/2009 | Jahnke | ............ | 850/22 |

* cited by examiner

Primary Examiner — David P Porta
Assistant Examiner — Yara B Green
(74) Attorney, Agent, or Firm — Mark Rodgers

(57) ABSTRACT

A method for performing sub-micron optical spectroscopy, using a heated SPM probe and far-field collection optics is described. The enhanced emission characteristics at a sharp heated tip constitute a highly localized wideband IR source. Thus the IR absorption and emission properties of a sample surface adjacent can be observed and measured in the farfield even though the interaction region is sub-micron in scale.... providing spatial resolution mapping of sample composition.

19 Claims, 4 Drawing Sheets

INFRARED IMAGING USING THERMAL RADIATION FROM A SCANNING PROBE TIP

RELATED APPLICATIONS

Not Applicable

FEDERALLY SPONSORED RESEARCH

Not Applicable

SEQUENCE LISTING

Not Applicable

BACKGROUND OF THE INVENTION

This invention relates to optical near-field scanning probe microscopy and in particular to a method for performing spectroscopy on a very small, in some cases sub-micron region of a sample surface.

Optical spectroscopy is a useful tool in many analytical fields such as polymer science and biology. Infrared spectroscopy, for example, is a benchmark tool used in science and industry to understand molecular composition and structure in fields including biology, chemistry and material science. Conventional optical spectroscopy and microscopy, however, have been limited by optical diffraction. For visible spectroscopy, the spatial resolution is typically limited to a few hundred nanometers, and for IR spectroscopy, spatial resolution is often limited to the scale of many microns. It would be particularly useful to perform IR spectroscopy on a highly localized scale, on the order of biological organelles or smaller, at various points on a sample surface. Such a capability would provide information about the composition of the sample, such as location of different materials or molecular structures. Conventional infrared spectroscopy is a widely used technique to measure the characteristics of material. In many cases the unique signatures of IR spectra can be used to identify unknown material. Conventional IR spectroscopy is traditionally performed on bulk samples which gives aggregate compositional and chemical structure information. When combined with Infrared Microscopy IR spectra may be gathered with resolution on the scale of many microns resolution. Confocal Raman spectroscopy also obtains spatially resolved chemical information with spatial resolution on the scale of hundreds of nanometers. Raman spectroscopy, however, is not currently as widely used as infrared spectroscopy. As such fewer reference spectra and fewer subject matter experts exist as compared to IR spectroscopy. It is therefore desirable. to have the ability to extend the power of IR spectroscopy to spatial scales that have been previously unavailable.

A variety of techniques have been proposed for performing IR spectroscopy on a sub-micron scale, using a combination of a Scanning Probe Microscope (SPM) and various means for delivering radiation to a sample region probed with the SPM. One such technique is described in U.S. application Ser. No. 11/803,421, owned by the assignees of this application. In this technique, pulses of variable wavelength IR radiation, are directed to the sample surface which is simultaneously probed by an SPM. Rapid sample thermal expansion in response to the pulsed radiation induces oscillation (contact resonance) of the SPM probe. The degree of absorption, and thus probe behavior, depends on the thermal absorption properties of the sample, so by varying the radiation wavelength and observing changes in the response of the SPM probe, highly localized information pertaining to spectral absorption may be obtained. Although this technique is quite promising, it does require an IR tunable pulsed light source, and such devices are. neither common nor inexpensive, as well as a complex optical system to deliver the radiation to a restricted region of the sample surface.

Other techniques based on Nearfield Optical Scanning Microscopy (NSOM) have been proposed. NSOM techniques are conventionally achieved in two ways. In transmissive SNOM, light is guided to the sample using a tapered optical fiber which terminates in a sub-wavelength aperture that acts as a near field source of radiation that can be smaller than the wavelength of radiation being used. Spectroscopic properties of samples can be obtained by recording the light that is reflected, transmitted, absorbed, and/or scattered after emerging from the aperture and interacting with a sample. Another form of SNOM works by focusing a far-field source onto the sharp tip of a scanning probe microscope and then measured the radiation scattered from the tip while the tip interacts with a sample. The optical field at the tip is spatially modulated by the tip apex geometry and the tip-sample distance. Depending on the tip coating and sample material the optical field can be locally enhanced or quenched on a length scale of several nanometers as determined by the tip apex geometries. In combination with spectroscopic techniques this can provide spectroscopic properties (e.g. infrared-vibrational) with nanometer spatial resolution. Both approaches, as with the contact resonance technique, require an external IR light source, typically in the form of an IR emitting laser or laser fed system or some other external illumination (coherent or partially coherent or incoherent) such as IR synchrotron radiation, Free-electron laser, or thermal IR sources (as used for conventional FT-IR spectrometers). The use of an external light source typically requires complex opto-mechanical systems employing lenses and/or mirrors to focus the radiation, and actuators to align it with the probe tip and sample. These requirements make the technique experimentally demanding and limits the accessible spectral range to the tuning range of the sources used.

It is highly desirable if SPM based optical spectroscopy could be accomplished without the need to add the expense and complexity of tunable excitation sources and associated optics, and with simplified techniques for decoupling the probe's mechanical response from spectroscopic properties of the sample. Generation of broadband optical radiation in a region very close to the probe tip and sample, combined with spectroscopic analysis in the far-field can provide a powerful tool to overcome limitations of the current instruments. The current invention discloses such a technique.

BRIEF SUMMARY OF THE INVENTION

The invention is a method of performing local spectroscopy on a sample using a probe microscope, the method includes the steps of placing a probe of the probe microscope adjacent a region of the sample, heating the probe to generate radiation near the probe tip, exposing the sample with the radiation, and detecting radiation emitted from the region of the sample due to interaction with the generated radiation from the probe, wherein the interaction is at least in part dependent on spectroscopic properties of the sample in the region near the tip. The emitted radiation may be a result of near-field mutual tip-sample polarization. In a particular embodiment, the detecting step includes directing the tip-scattered and emitted radiation from the sample to a Fourier Transformed Spectrometer. In an alternative embodiment a region of a sample may be heated to generate thermal radiation that is modulated by the probe-sample interaction. Detection of radiation emitted to the far field can be used to measure local spectroscopic properties of the sample region. Spectroscopic properties can include absorbance, reflectivity, scattering, dispersion, vibrational or electronic modes/resonances and other properties that depend on wavelength, or equivalently radiation frequency or wavenumber.

In one embodiment, the method includes the step of using the detected radiation to construct an absorption spectrum of the sample. In another embodiment, the method includes the step of using the detected radiation to construct a dispersion measurement of the sample.

In another embodiment the method includes modulating the relative distance between the probe tip and sample at a frequency and detecting radiation emitted from the probe and/or sample at that frequency and/or one or more of the harmonics of that frequency In a version of the method, the periodic modulation is induced by thermal bending of the probe. The detection of radiation at a modulation frequency and/or its harmonics can substantially reduce a background signal of emitted radiation.

In a further embodiment the method may include the steps of generating relative lateral motion between the probe and sample and detecting radiation emitted from the probe/sample interaction as a function of relative probe-sample position. Thus the method can also include creating a spatial map of radiation emitted by the sample with a spatial resolution preferably better than 1 μm. The method can further include steps of detecting radiation emitted from a sample at least one wavelength and using the detected radiation to create a compositional map of a sample or the step of identifying the chemical composition of a sub-micron region of the sample using the spectrum of the detected radiation.

BRIEF DESCRIPTION OF THE DRAWINGS

The invention will be better understood by referring to the following figures.

DETAILED DESCRIPTION OF THE INVENTION

Nanoscale Thermal Radiation Source

The invention is the use of thermal radiation from a heated scanning probe tip as a near-field source of radiation. The tip can be heated, e.g., electrically and/or optically to generate a local source of radiation that can interact with a region of a sample without requiring additional optics to focus and direct the radiation. As opposed to the use of external illumination by, e.g., a laser source, this provides high spectral bandwidth, saves the costs of an external light source, and is technologically easier to implement since only optics and alignment for far-field detection is required. In combination with spectrally resolved optical techniques (e.g., Fourier Transform spectroscopy) spectroscopic information with a simultaneous lateral optical image of the sample can be obtained.

Figure 1:
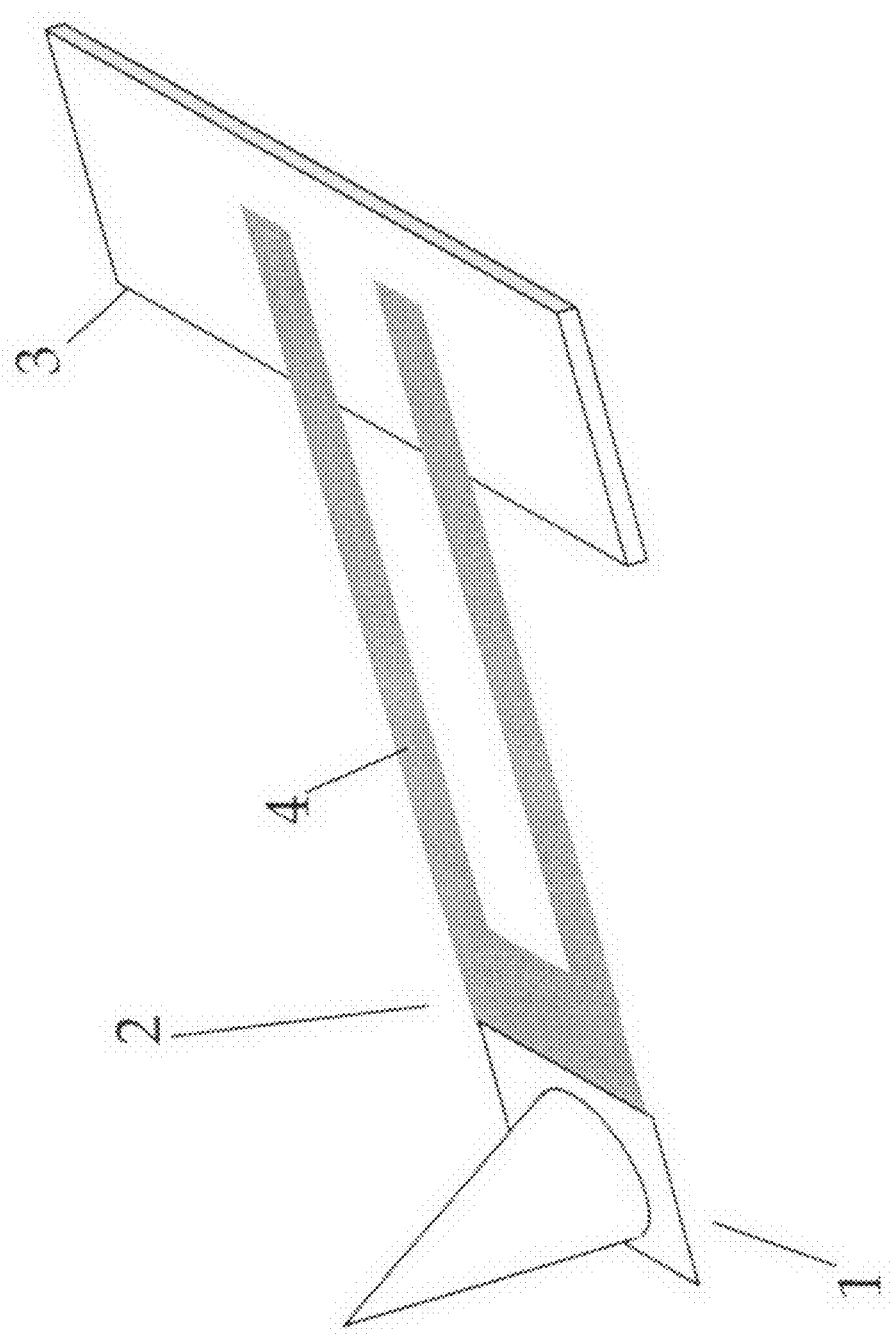
FIG. 1 is a depiction of an SPM probe suitable for practicing the invention.

In a particular embodiment, the heating of the probe tip can be accomplished conveniently with existing Nano thermal analysis (NanoTA) and/or Scanning Thermal Microscopy (SThM) probes. Suitable probes are described in co-pending U.S. application Ser. No. 11/405,772,also owned by the assignee of this application. Such probes are also discussed extensively in many publications by Professor William King and colleagues of the University of Illinois Urbana-Champaign, Georgia Tech, and IBM. The relevant parts of the probe are shown in FIG. 1. Such probe structures, and their general characteristics, are known in the field of SPM. As shown a lever arm 2 extends from a substrate base 3 with an integral sharp tip 1 extending from a region near the free end of the lever arm 2. Such probes are typically batch fabricated using wafer processing or similar technology. These probes also include an embedded heater 4, whose purpose it to heat the probe tip 1. The heater region typically consists of a resistive region that is heated when electrical current is passed though the resistive region of the probe. The resistive region can be formed by constrictions in conductors, regions of lower semiconductor doping and/or thin films of conducting or semiconducting materials. It may be desirable (but not necessarily required) to pattern the resistive area to be localized to a region near and/or including the probe tip. In this case the hot spot generated by the resistive heating will be located near or collocated with the probe tip. For the current invention, it may also be desirable to pattern the resistive area in a fashion that that may enhance antenna geometry for radiation emitted by the heated portion of the probe.

Figure 2:
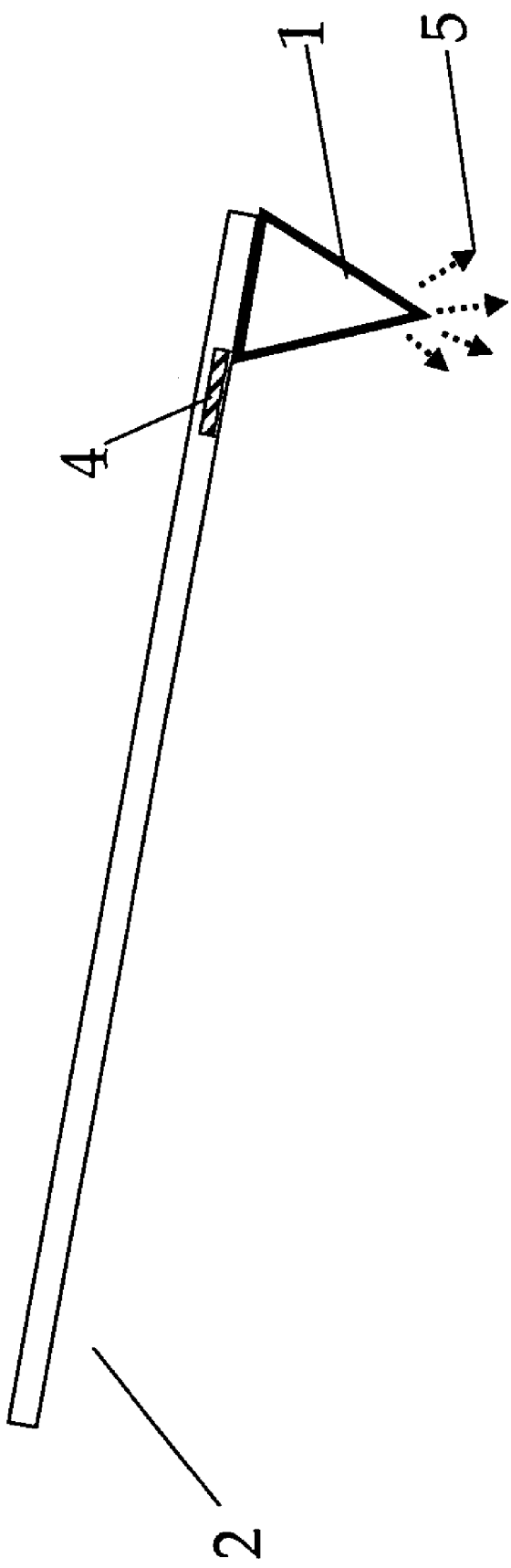
FIG. 2 illustrates the effect of radiation intensity enhancement around a sharp tip.

A tip such as described above can be heated electrically to temperatures above 1200° C. and at frequencies up to the MHz range. Of course other ways can be used to heat an SPM tip, but the nanoTA tip of the type shown is particularly suitable from a both a convenience and cost standpoint. As shown in FIG. 2, heating the tip results in a thermal emission of optical radiation near the tip.

While Planck's law of blackbody radiation determines the radiated far-field spectral intensity distribution of a body of certain temperature it has been shown that the nonradiating optical near-field in close proximity to the surface of the emitter is spatially confined and exhibits a higher electromagnetic density of states compared to the far-field. Although generated by uncorrelated spontaneous emission, at distances up to 100 nm from the surface the near-field exhibits strong temporal and spatial coherence. Near the surface the local density of electromagnetic states in thermal equilibrium is enhanced over the vacuum density of states (DOS), e.g., for aluminum in the IR by up to 5 orders of magnitude at 10 nm distance. Thus even though the heating in the lever is not confined to the tip itself, the area closely adjacent to the tip has a much higher density of states, enough that the other parts of the probe radiate at a much lower level, and do not substantially contribute to probe-sample interaction. Therefore the field around the tip constitutes a laterally and. vertically positionable, nanometer scale thermal emitter.

In the case that the heating is collocated with the apex of the tip, an evanescent field generated by the tip can interact directly with the sample. In the case that the heated region is somewhat more distant, a far field radiation pattern may develop that is then modulated by the shape of the tip and the interaction with the sample. In either case a local radiation field is generated that is modulated by the size of the tip and its position relative to the sample. The invention uses this radiation pattern and interaction to obtain local spectroscopic measurements on the sub-micron scale.

Alternately, the tip can also be heated remotely for example using a laser. A laser can be focused to a spot that is incident on the cantilever. The wavelength of the laser is chosen to provide sufficient absorption by at least a region of the probe to provide thermal generation of radiation by the probe. To increase the efficiency of this process, the probe may be manufactured using highly absorbing materials and/or coatings. The probe can also be heated using other remote sources, for example small heaters that are placed in close proximity to the probe. For example, a small resistive or radiant heater can be incorporated into a probe mount that fastens the probe to a probe microscope, for example. In each of these cases above involving a remote heater, near field optical spectroscopy can be performed without the need to integrate the heater into the probe itself. This approach can simplify the manufacturing requirements and hence cost for the probes.

Local Field Enhancement by the Probe Tip

A sample is then exposed to the radiation generated by the heated probe and the interaction of the sample to this radiation can provide spectroscopic information about the sample. Use of a sharp probe in the radiation path has a distinct advantage. The field at the tip apex can be further enhanced due to the effect of the sharp curvature of the tip apex. This so-called "lighting rod effect" acts to sharpen field gradients around sharp objects and thus provides an intensification of the radiation field. Additional enhancement can be provided by resonant enhancement of the local fields. Resonant field enhancements have been reported by many authors, including the inventor. The exact mechanisms of the resonant enhancement of radiation is an area of active research in the scientific community, but such enhancement can result, for example, by excitation of geometry related antenna eigenmodes or surface-plasmon polariton modes. Using tip-shape and resonant enhancement techniques, field enhancements of several orders of magnitude have been reported.

The spatial extent of the field enhancement can be quite small. Field enhancements have been reported that occur on length scales that are determined by or even smaller than the end radius of an AFM probe time. This has the effect of enhancing the resolution of the spectroscopic measurement as the highest intensity radiation can be confined to a scale well below the wavelength of the radiation and specifically to the sub-micron scale.

So the part of the sample adjacent to the probe is exposed to a spatially confined and enhanced radiation field and also to a weaker far-field component. It is desirable to extract a signal that is sensitive to the spatially confined field while suppressing background response from the far field radiation. To achieve this, in one embodiment, the tip-sample distance is modulated at one or more frequencies. Since the strength of the local field enhancement is highly dependent on the tip sample distance, this creates an oscillating optical signal that can be detected in the far field. The light scattered from the far field illumination may also have a slight dependence on tip-sample distance and may contribute to the oscillating optical signal detected in the far field. The local tip-induced field enhancement, however, is also highly non-linear. For this reason a sinusoidal modulation of the tip-sample distance results in generation of oscillating far field signals at higher harmonics of the modulation frequency. The resolution of the technique can be enhanced by measuring the light collected at one or more of the harmonic frequencies.

Sample Excitation and Detection of Scattered Radiation

Figure 3:
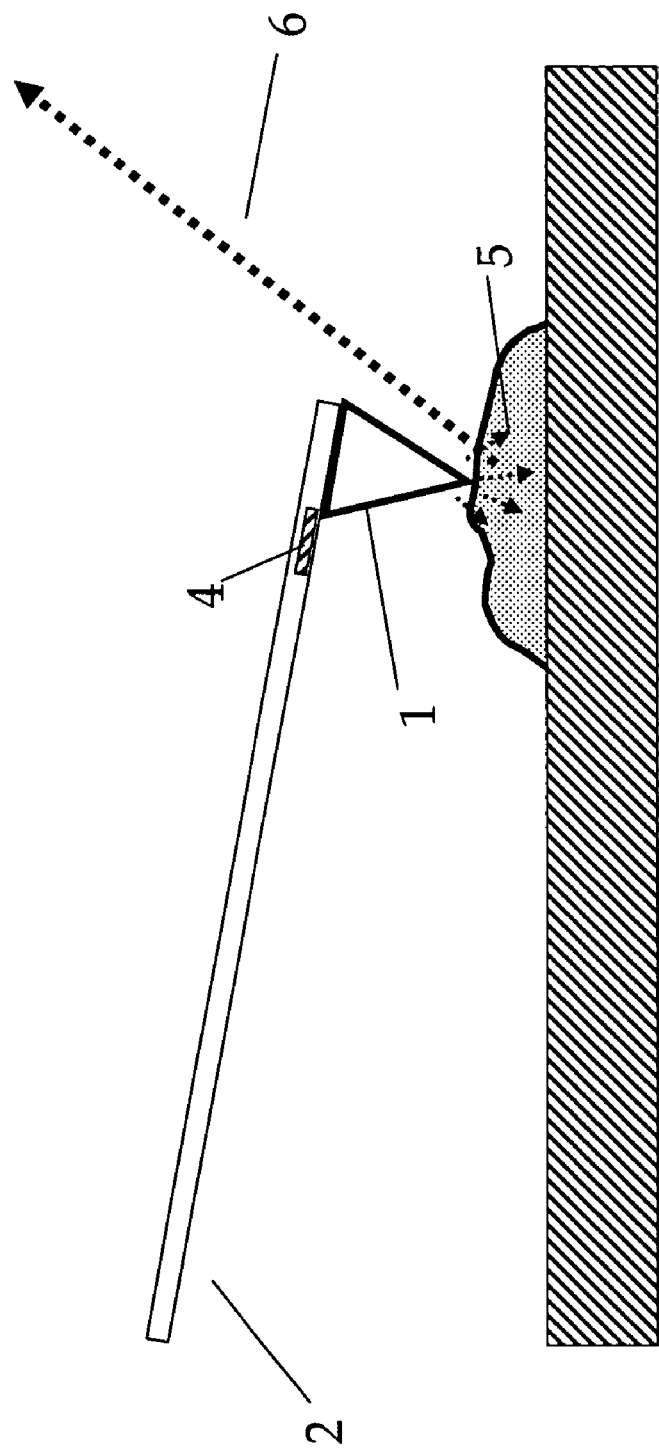
FIG. 3 illustrates operation of the invention.

The local field enhancement provides a probe that can excite the sample with high spatial resolution and wideband IR radiation. The absorption and re-emission of that energy will depend on the IR absorption properties of the material adjacent the tip. As shown in FIG. 3, radiation from the tip-sample can be observed in the far-field 6. Far-field images of the tip-sample interaction will have at least a component dependent on the submicron scale, IR absorption properties, and thus material properties of the sample can be characterized on a sub-micron scale with no elaborate tunable radiation source, and requiring only conventional far-field optics.

The tip-scattered and emitted thermal radiation 6 can be collected by an optical setup and directed to a detector. The tip is brought in close proximity to the sample and the sample or the tip can be raster scanned while the optical-signal is detected by the detector. "Close proximity" in this case can mean that the tip may be as close as directly in contact with the sample or spaced a small distance away from the sample. The spacing can be adjusted to provide the desired balance between interaction force and sufficient optical field enhancement to be detectable. In practice, the probe apex is usually positioned well within the optical near-field of the radiation being generated. This is usually a fraction of the wavelength and corresponds to distances of nanometers or tens of nanometers. Larger tip-sample separations may be employed at the cost of signal strength.

Light is collected in the far field with a suitable photodetector. For high signal strengths it may be desirable to employ collection optics with high numerical aperture, i.e. optics that collect light from a large solid angle. In one embodiment the inventor has employed a Cassegrain objective with a NA of 0.5. Cassegrain objectives employ reflective focusing surfaces and are commonly used on IR microscopes. The use of reflective collection optics can eliminate refractive dispersion that can otherwise cause light of different wavelengths to focus at different locations.

Light collected at the detector may be demodulated to determine the light intensity and/or phase over a selected range of frequencies. This type of dynamic analysis can be used to detect the oscillating optical signals resulting from the tip-sample interaction where the tip-sample distance in modulated. This dynamic analysis can be performed in a variety of ways. For example, the detector signal can be demodulated with one or more lock-in amplifiers which extract signals at specific frequencies. Alternately, bandpass filters may be employed in combination with RMS detectors. Alternately, the time dependent detector signal can be analyzed using fast fourier transforms (FFTs), tone analysis, and/or harmonic inversion, or other similar methods, for example.

In one embodiment of the invention, the scattered light is detected in the far field with the Michelson interferometer detection system of a FTIR, for example with a Mercury Cadmium Telluride (MCT) detector, a Deuterated Triglycine Sulfate (DTGS), or bolometer detector. The FTIR or similar interferometer includes a moving mirror that is swept to adjust the optical path difference between the signal beam and a reference beam while recording the intensity on the detector. In one embodiment, the beam scattered from the tip-sample interaction is split by a beam splitter and directed along two paths and then recombined at the detector. The two beams interfere with each other and wavelength specific information can be determined using a Fourier transform discussed below. The detector signal can be demodulated as described previously to extract the harmonic content at one or more frequencies.

Once any appropriate signal conditioning and/or demodulation is performed, a Fourier transform of the modified signal can be calculated over the range of the optical path difference swept by the moving mirror. This spatial Fourier transform contains the spectral dependence of the radiation scattered from the tip-sample interaction. "Spectral dependence" refers to the variation in the measured property as a function of wavelength, frequency or wavenumber. The spectral dependence of the absorption (i.e. absorption spectrum) can be constructed from this spectral dependence. (In practice the Fourier transform algorithms also typically apply an apodization to account for the fact that the Fourier transform is calculated over a finite optical path difference rather than an infinite distance.)

In addition or instead of a point detector, focal plane arrays may be employed to capture the spatial distribution of the far field light pattern if desired. These may also be used in combination with a grating spectrometer rather than an interferometer. Either FTIR or a grating spectrometer would should allow for obtaining the desired spectral resolution.

Absorption and Dispersion Spectra

The optical response of the sample to the local excitation is described by its complex dielectric function that contains a real (dispersive) and imaginary (absorptive) component. A vibrational (molecular or phonon) resonance of the material manifests itself as characteristic spectral variations (peaks) of the dielectric function. The interaction of the near-field thermal radiation with the material is mediated by that dielectric function and in turn alters the spectral characteristic of the emitted radiation (peaks or dips modified by relative optical phase). In the case of a weakly coupled oscillation like infrared excitation of a molecular vibration, the scattering response is not altered by a phase shift in any significant way and the amplitude of light modulation at the photodetector will directly resemble a corresponding absorption spectrum. Note that the word "absorbance" may seem ill applied at the scale well below the wavelength because the term is usually applied to bulk samples on scales of many wavelengths. In bulk samples, optical absorption can occur due to radiation interacting with the vibrational states of a material. Specifically the imaginary part of the dielectric constant is representative of the absorption of a material. Dielectric behavior results from the polarization of the material induced by the radiation. While the term "absorption" may seem to be ill applied, the same basic physics occurs in the case of both far field radiation interacting with a bulk sample and near field radiation interaction on sub-wavelength scales. That is the electric field vector of the radiation interacts with vibrational states of matter to cause local polarization changes and we refer to the imaginary component of the response as "absorption" for the purposes of this application. Because the same underlying physics applies, far field radiation that has resulted from interaction of near-field radiation with material vibrational resonances carries information that may be equivalent to a far field absorption spectrum. This is because in the case of weakly coupled oscillators real and imaginary part of the dielectric function are closely related and can be directly converted from one into the other by use of the Kramers-Kronig relation. Strong scattering thus corresponds to strong absorption and vice versa. For this reason, a plot of the light modulation amplitude(s) as a function of wavelengths will show a pattern with peaks at wavenumbers corresponding to conventional FTIR spectroscopy. Thus such a plot can be equivalent to an infrared absorption spectrum. Infrared spectra generated from the nano thermal IR source may be compared against library or reference spectra to aid in the characterization and identification of specific materials on the sub-micron scale. For example, the nano thermal IR data may be compared against bulk FTIR data to locally identify materials on scales far smaller thank conventional IR spectroscopy and microscopy.

In the case of strongly coupled oscillators, such as phonons in solid material, comparison with tabulated phonon frequencies from neutron scattering or Raman spectroscopy have to be used in combination with numerical modeling to assign the scattering resonances to the respective phonon modes of the material.

The sample material dependent tip-sample coupling then gives rise to the imaging contrast, thus allowing the creation of a sub-micron resolution map of absorption or dispersion properties, which in turn allows for sub-micron scale materials characterization of the sample surface. Images of varying absorption and/or dispersion can be created by plotting the measured detector signal as a function of relative tip-sample position. Chemometric techniques can be applied to efficiently discriminate between multiple materials in complex blends. The relative scanning motion can be created by moving the sample, the probe or a combination of the two. A large number of scanning technologies are known in the art, including but not limited to piezoelectric, electrostatic, electrostrictive, magnetostrictive, inductive, and thermomechanical devices. Any device that can produce relative motion between the probe tip and sample with sufficient resolution may be suitable.

Figure 4:
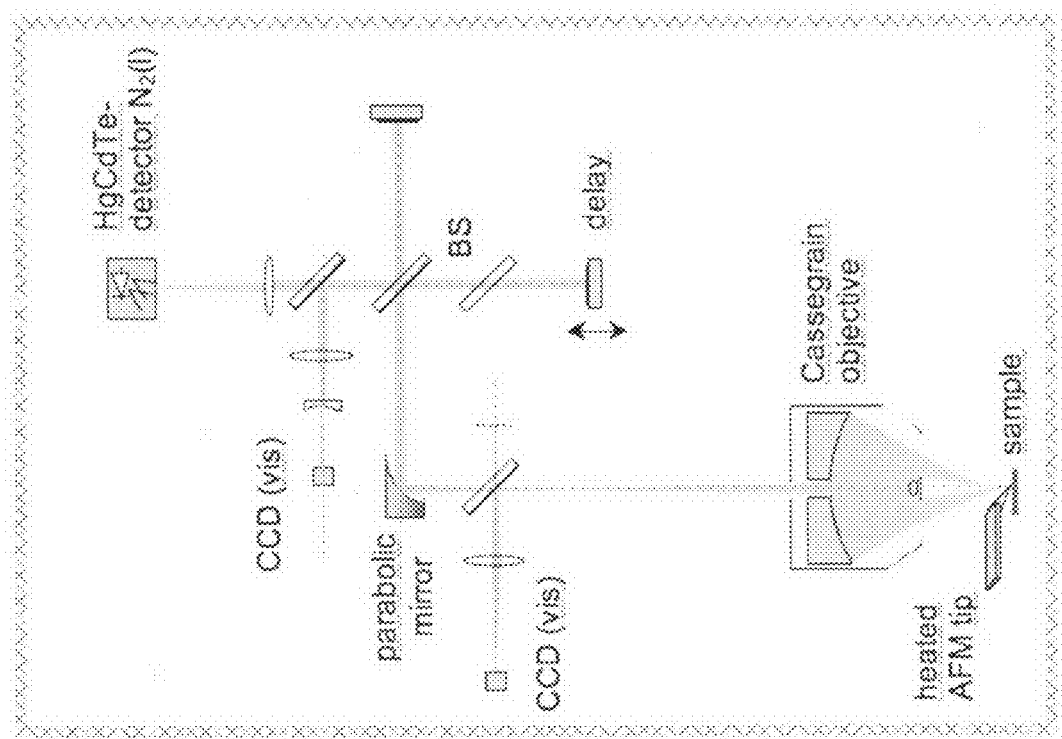
FIG. 4 is a detailed rendition of particular instantiation of the invention.

FIG. 4 shows an example of an implementation including the optical setup. A reflective Cassegrain objective (NA=0.5, working distance=28 mm) collects the tip-scattered radiation. It is directed into a simple Michelson interferometer for FT-IR spectroscopy (a path lengths of 5 cm would provide a spectral resolution of 0.2 cm$^{-1}$). The IR radiation is subsequently focused on a liquid nitrogen cooled mercury-cadmium-telluride (HgCdTe, MCT) detector. To extract the near-field contribution from the far-field background a time-harmonic ~10 nm vertical tip-sample distance modulation is applied. Using lock-in detection, the synchronized frequency component of the scattered signal at the fundamental or higher harmonic frequency selects the near-field contribution. The difference in optical signal from the tip itself compared to the tip interacting with the surface can also be determined by observing the tip away from the surface. Due to the highly localized nature of the evanescent field around the tip, even a small pull-back of the tip, 100 nm or less is sufficient to sufficiently reduce the tip-sample optical interaction to allow the background tip alone optical signals to be characterized. Such positioning of an SPM tip both laterally and vertically to allow for periodic or other tip-sample distances profiles along with imaging, probe heating and the other attributes required by the invention are well within the. capability of commercial SPM systems. And moving the optical detection, measurement and spectroscopy to the far-field allows for the use of commonly available components.

Other implementations are including but not limited to different detectors for different spectral regions (near-IR, mid-IR, THz), methods for spectral selection (grating etc.), optical signal collection (reflective and refractive objectives and lenses), different methods for tip heating (laser, electrical), and interferometric methods to deduce both optical amplitude and phase information.

I claim:

1. A method of performing local spectroscopy on a sample suing a probe microscope, the method comprising the steps of:
    placing a probe tip of the probe microscope adjacent a region of the sample;
    heating the probe to generate radiation near the probe tip;
    exposing the sample to the generated radiation;
    detecting radiation emitted from the region of the sample due to interaction between the sample and generation radiation.

2. The method of claim 1 further comprising the steps of:
    analyzing a spectral dependence of the emitted radiation to characterize a spectroscopic property of the sample region.

3. The method of claim 2 wherein the spectroscopic property is a absorption spectrum of the sample region.

4. The method of claim 2 wherein the spectroscopic property is a dispersion measurement of the sample region.

5. The method of claim 1 wherein the detecting step includes directing the emitted radiation from the sample to at least one of a Fourier Transformed Spectrometer, a Michelson interferometer, and a grating spectrometer.

6. The method of claim 1 further comprising the steps of:
generating vertical periodic relative motion between the probe and sample;
detecting radiation emitted from the sample at a frequency corresponding to the periodic relative motion between the probe and sample.

7. The method of claim 6 wherein the periodic motion is produced by thermally induced bending of the probe.

8. The method of claim 6 wherein detection of radiation at a frequency corresponding to the periodic probe-sample motion to reduce the background signal of emitted radiation.

9. The method of claim 1 further comprising the steps of:
generating relative lateral motion between the probe and sample;
detecting radiation emitted from the sample as a function of relative probe-sample position.

10. The method of claim 9 further comprising the step of: creating a spatial map of radiation emitted by the sample.

11. The method of claim 10 wherein the spatial map has a spatial resolution better than 1 µm.

12. The method of claim 9 further comprising the step of:
using the detected radiation to create a material compositional map of a sample.

13. The method of claim 2 further comprising the step of:
identifying the chemical composition of a sub-micron region of the sample using the spectrum of absorbed radiation.

14. The method of claim 3 wherein the absorption spectrum includes wavelengths of infrared radiation.

15. The method of claim 3 wherein the absorption spectrum is compared against at least one reference spectrum.

16. The method of claim 2 wherein the spectral dependence of emitted radiation is used to determine the chemical composition of the sample region.

17. The method of claim 16 wherein the chemical composition is determined for a sample region with a resolution of better than 1 µm.

18. The method of claim 11 wherein the detected radiation includes infrared radiation.

19. The method of claim 2 wherein the spectroscopic property is a spectrum of the vibrational or electronic modes/resonances of the region of the sample.

* * * * *